United States Patent
Dayal et al.

(10) Patent No.: US 8,547,989 B2
(45) Date of Patent: Oct. 1, 2013

(54) METHODS AND SYSTEMS FOR LTE-WIMAX COEXISTENCE

(75) Inventors: Pranav Dayal, San Diego, CA (US); Ayman Naguib, Cupertino, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 958 days.

(21) Appl. No.: 12/431,117

(22) Filed: Apr. 28, 2009

(65) Prior Publication Data

US 2010/0135272 A1 Jun. 3, 2010

Related U.S. Application Data

(60) Provisional application No. 61/119,024, filed on Dec. 1, 2008.

(51) Int. Cl.
*H04J 3/16* (2006.01)
*H04J 3/24* (2006.01)
*H04L 12/56* (2006.01)

(52) U.S. Cl.
USPC .................. 370/437; 370/468; 370/474

(58) Field of Classification Search
None
See application file for complete search history.

(56) References Cited

U.S. PATENT DOCUMENTS

| | | | |
|---|---|---|---|
| 7,903,648 B2* | 3/2011 | Bertram et al. | 370/389 |
| 2003/0058887 A1* | 3/2003 | Dworkin et al. | 370/470 |
| 2008/0002611 A1* | 1/2008 | Walker et al. | 370/328 |
| 2009/0116427 A1* | 5/2009 | Marks et al. | 370/328 |
| 2009/0185632 A1* | 7/2009 | Cai et al. | 375/260 |
| 2009/0219875 A1* | 9/2009 | Kwak et al. | 370/329 |
| 2009/0221319 A1 | 9/2009 | Lan et al. | |
| 2009/0225689 A1 | 9/2009 | Yu | |
| 2010/0278094 A1* | 11/2010 | Lee et al. | 370/312 |
| 2011/0032853 A1* | 2/2011 | Moon et al. | 370/280 |
| 2011/0044215 A1* | 2/2011 | Kim et al. | 370/280 |
| 2011/0268135 A1* | 11/2011 | Kim et al. | 370/474 |

FOREIGN PATENT DOCUMENTS

| | | |
|---|---|---|
| WO | 2006123493 A1 | 11/2006 |
| WO | WO2008058470 | 5/2008 |
| WO | WO2008061470 | 5/2008 |

OTHER PUBLICATIONS

U.S. Appl. No. 61/044870, Kim et al., TDD Frame Configuration Considering Coexistence with Other TDD Systems, Apr. 14, 2008, pp. 1-14.*
U.S. Appl. No. 61/048543, Moon et al., TDD Frame Configuration Considering the Coexistence with Other TDD Systems, Apr. 28, 2008, pp. 1-17.*
U.S. Appl. No. 61/044890, Kim et al., UL Alignment Methods for Coexistence with Heterogeneous TDD Networks, Apr. 14, 2008, pp. 7-19.*
U.S. Appl. No. 61/016812, Lee et al., MBS Frame Structure, Dec. 27, 2007, pp. 2-4.*

(Continued)

*Primary Examiner* — Gregory Sefcheck
*Assistant Examiner* — Ashley Shivers
(74) *Attorney, Agent, or Firm* — Tyler J. Overall

(57) ABSTRACT

Methods and apparatus for supporting coexistence between two different radio access technologies (RATs), such as the Long Term Evolution (LTE) standard and one of the IEEE 802.16 standards, are provided. To accomplish this coexistence, a multi-mode base station (BS) may replace transmission gaps in a frame of a first RAT with subframes or symbols of the second RAT and transmit the resulting dual-RAT frame. In this manner, a single BS may support and communicate according to two different RATs simultaneously.

48 Claims, 11 Drawing Sheets

(56) References Cited

OTHER PUBLICATIONS

International Search Report—PCT/US2009/066032—International Search Authority, European Patent Office, Jun. 23, 2010.
Martin, Frederick L. et al.: "Early Opportunities for Commercialization of TV Whitespace in the U.S (invited paper)," Crowncom 2008 3rd International Conference on Cognitive Radio Oriented Wireless Networks and Communications. IEEE, Piscataway, NJ, USA, (May 15, 2008), pp. 1-5, XP031285137, ISBN: 978-1-4244-2301-9.
Written Opinion—PCT/US2009/066032—ISA/EPO—Jun. 23, 2010.
Taiwan Search Report—TW098140435—TIPO—Mar. 11, 2013.

* cited by examiner

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 7

METHODS AND SYSTEMS FOR LTE-WIMAX COEXISTENCE

CLAIM OF PRIORITY

This application claims the benefit of priority from U.S. Provisional Patent Application Ser. No. 61/119,024, entitled "Methods and Systems for LTE-WIMAX Coexistence" and filed on Dec. 1, 2008, which is assigned to the assignee of this application and is fully incorporated by reference for all purposes.

TECHNICAL FIELD

Certain embodiments of the present disclosure generally relate to wireless communications and, more particularly, to methods to provide coexistence between different radio access technologies (RATs).

SUMMARY

Certain embodiments of the present disclosure generally relate to methods and apparatus for supporting coexistence between different standards, such as the LTE standard and the WiMAX standard.

One embodiment provides a method of wireless communications. The method generally includes determining one or more blank subframe structures in a frame of a first radio access technology (RAT), generating one or more second subframe structures of a second RAT to replicate the timing of the blank subframe structures, and transmitting the frame of the first RAT with the second subframe structures of the second RAT replacing the blank subframe structures of the first RAT in the transmitted frame.

One embodiment provides an apparatus for wireless communications. The apparatus generally includes logic for determining one or more blank subframe structures in a frame of a first RAT, logic for generating one or more second subframe structures of a second RAT to replicate the timing of the blank subframe structures, and logic for transmitting the frame of the first RAT with the second subframe structures of the second RAT replacing the blank subframe structures of the first RAT.

One embodiment provides an apparatus for wireless communications. The apparatus generally includes means for determining one or more blank subframe structures in a frame of a first RAT, means for generating one or more second subframe structures of a second RAT to replicate the timing of the blank subframe structures, and means for transmitting the frame of the first RAT with the second subframe structures of the second RAT replacing the blank subframe structures of the first RAT.

One embodiment provides an apparatus for wireless communications. The apparatus generally includes a processor configured to determine one or more blank subframe structures in a frame of a first RAT, generate one or more second subframe structures of a second RAT to replicate the timing of the blank subframe structures, and transmit the frame of the first RAT with the second subframe structures of the second RAT replacing the blank subframe structures of the first RAT in the transmitted frame; and a memory coupled to the processor.

One embodiment provides a computer-program product for wireless communications. The computer-program product typically includes a computer-readable medium having instructions stored thereon, the instructions being executable by one or more processors. The instructions generally include instructions for determining one or more blank subframe structures in a frame of a first RAT, instructions for generating one or more second subframe structures of a second RAT to replicate the timing of the blank subframe structures, and instructions for transmitting the frame of the first RAT with the second subframe structures of the second RAT replacing the blank subframe structures of the first RAT.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 7 illustrates various subframe configurations for LTE-TDD according to the LTE standard, in accordance with certain embodiments of the present disclosure.

DETAILED DESCRIPTION

Figure 1:
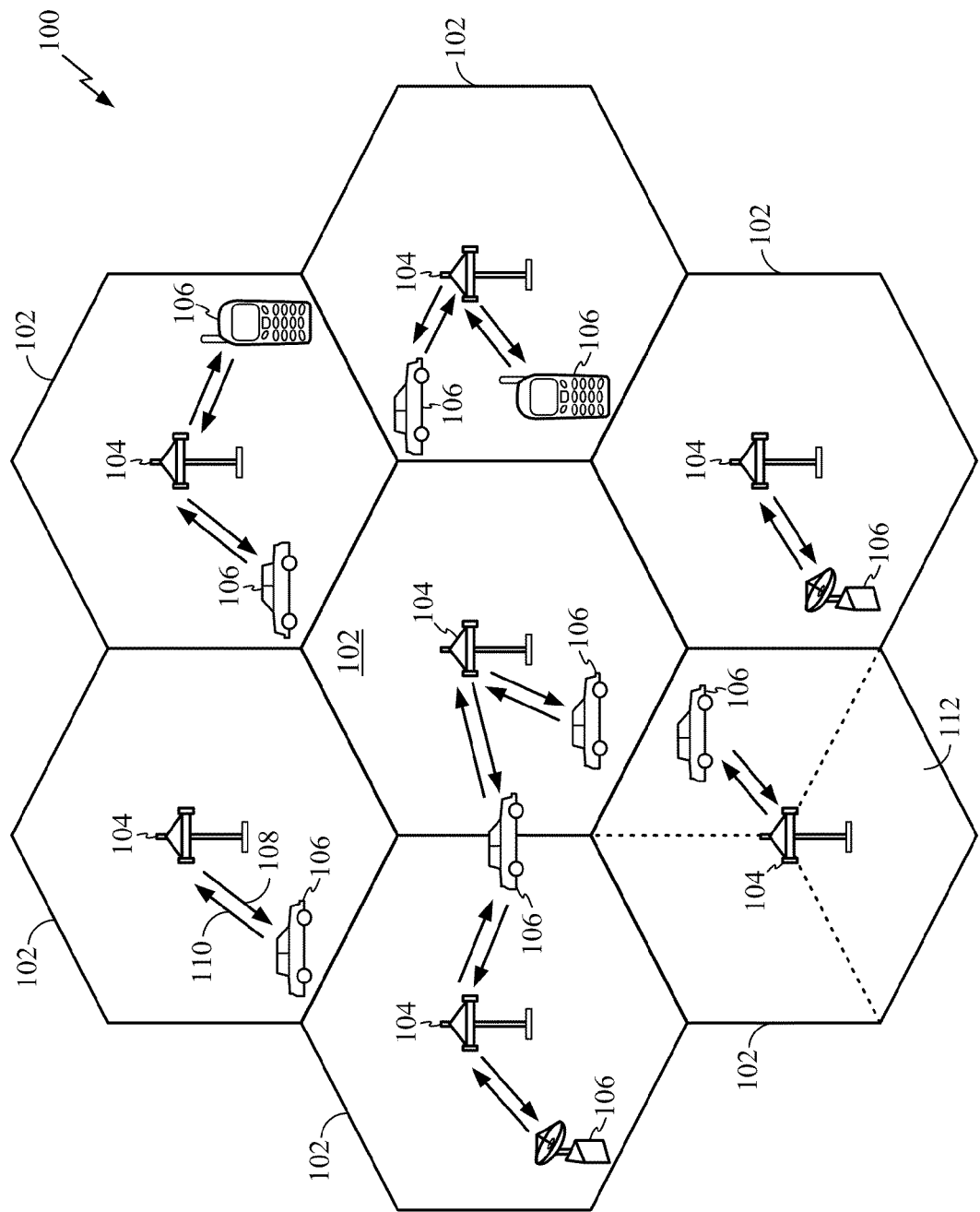
FIG. 1 illustrates an example wireless communication system, in accordance with certain embodiments of the present disclosure.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems specified by the Worldwide Interoperability for Microwave Access (WiMAX) standard.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

Certain embodiments of the present disclosure provide techniques and apparatus for supporting coexistence between two different radio access technologies (RATs), such as the Long Term Evolution (LTE) standard and one of the IEEE 802.16 standards. To accomplish this coexistence, a multi-mode base station (BS) may replace transmission gaps in a frame of a first RAT with subframes or symbols of the second RAT and transmit the resulting dual-RAT frame. In this manner, a single BS may support and communicate according to two different RATs simultaneously.

Exemplary Wireless Communication System

The techniques described herein may be used for various broadband wireless communication systems, including communication systems that are based on an orthogonal multiplexing scheme. Examples of such communication systems include orthogonal frequency-division multiple access (OFDMA) systems, single-carrier frequency-division multiple access (SC-FDMA) systems, and so forth. An OFDMA system utilizes orthogonal frequency-division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

WiMAX is one example of a communication system based on an orthogonal multiplexing scheme. As noted above, there are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16 is an emerging standard organization to define an air interface for fixed and mobile broadband wireless access (BWA) systems. IEEE 802.16 approved IEEE 802.16d-2004 in May 2004 for fixed BWA systems and published IEEE 802.16e-2005 in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

The IEEE organization has also released a draft of the IEEE 802.16m standard, which promises to deliver wireless speeds up to 1 gigabit per second (Gbps). Such speed is based on multiple-input multiple-output (MIMO) technology. Technically, the IEEE 802.16m standard is not part of the WiMAX standard, but the two standards will be compatible. Furthermore, the IEEE 802.16m standard is expected to be 4G-compatible with future wireless networks.

Long Term Evolution (LTE) is another emerging standard designed for 4G networks. Described in documents from an organization named the Third Generation Partnership Project (3GPP), LTE is intended to improve the Universal Mobile Telecommunication System (UMTS) mobile phone standard to cope with future technology evolutions. Release 8 of the LTE standard adds the air interface, which is a completely new system based on OFDMA in the downlink and SC-FDMA in the uplink that efficiently supports MIMO.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time-division duplex (TDD) and frequency-division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
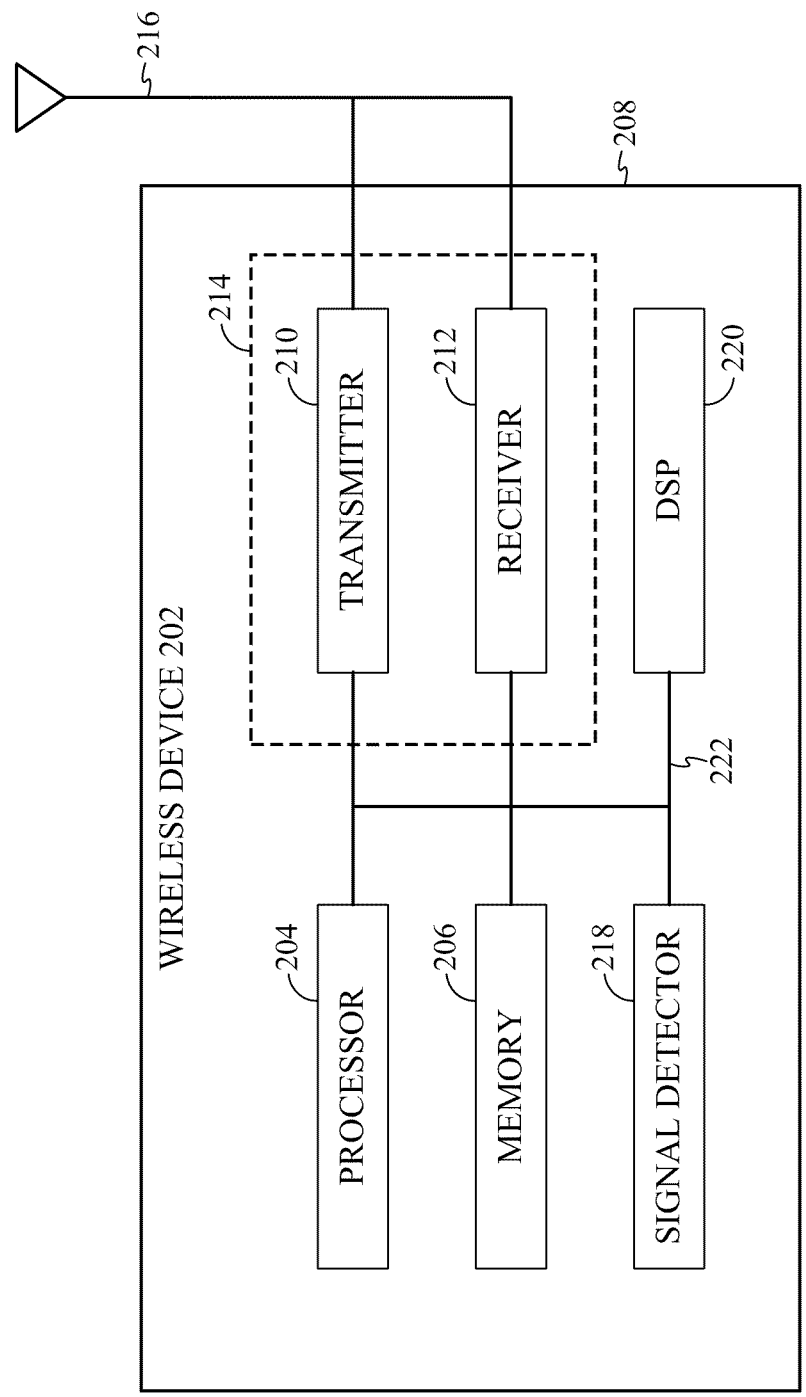
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
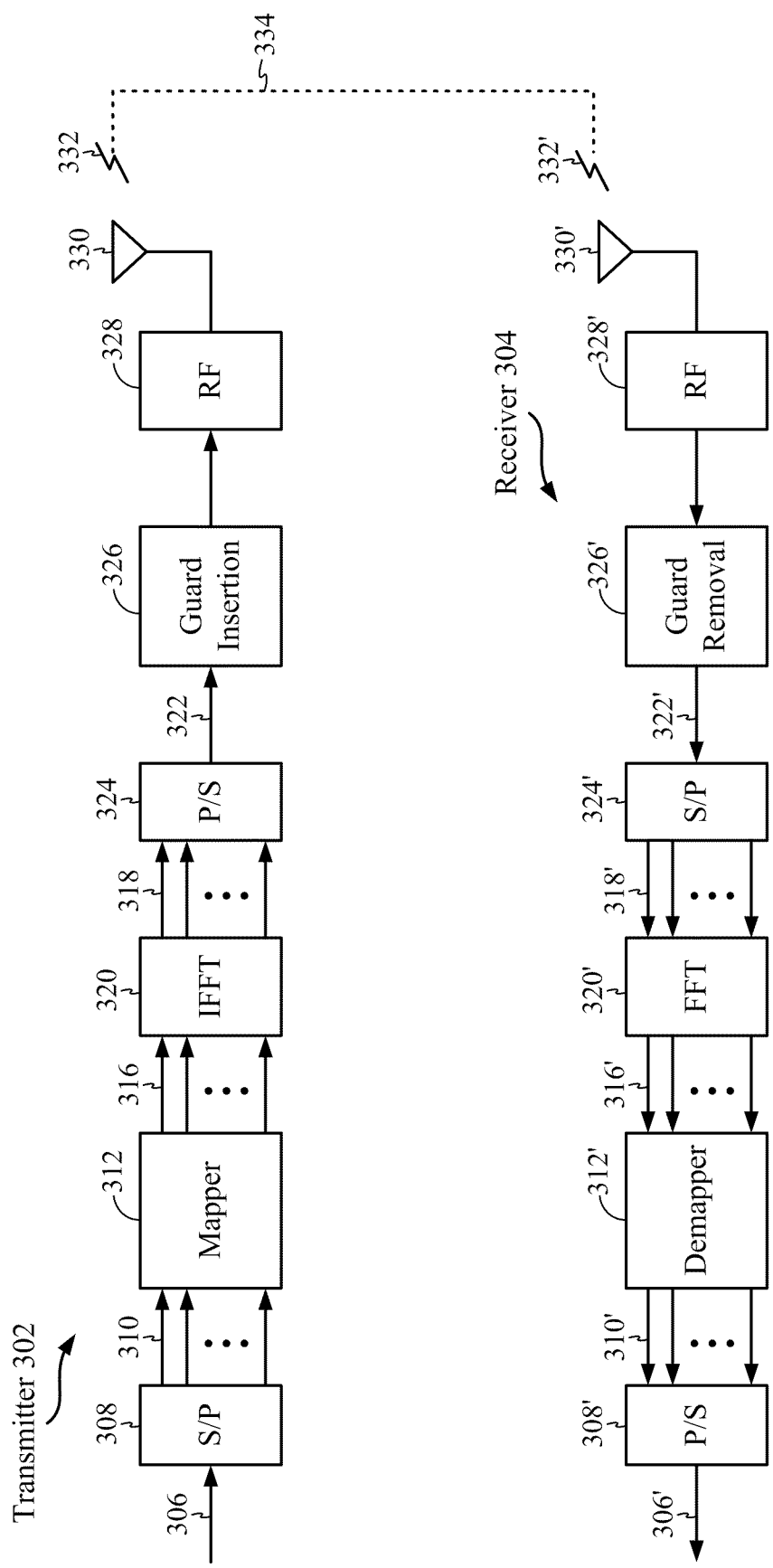
FIG. 3 illustrates an example transmitter and an example receiver that may be used within a wireless communication system that utilizes orthogonal frequency-division multiplexing and orthogonal frequency-division multiple access (OFDM/OFDMA) and/or single-carrier frequency-division multiple access (SC-FDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary OFDM/OFDMA Frame

Figure 4:
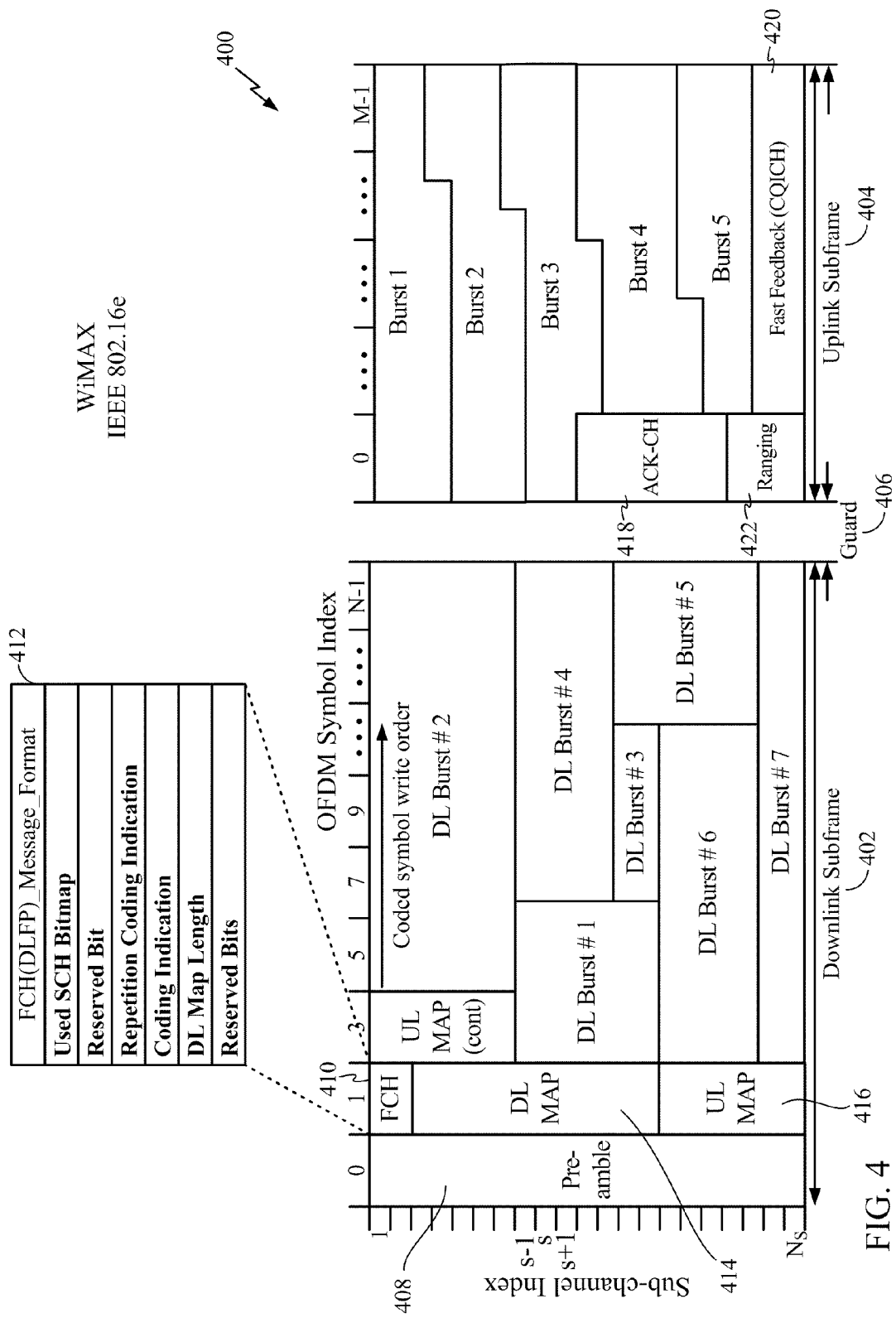
FIG. 4 illustrates an example OFDM/OFDMA frame for Time Division Duplex (TDD) according to the IEEE 802.16e standard, in accordance with certain embodiments of the present disclosure.

Referring now to FIG. 4, an OFDM/OFDMA frame 400 for a Time Division Duplex (TDD) implementation—in accordance with the IEEE 802.16e standard, for example—is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410. The DLFP 412 for Mobile WiMAX may comprise information about the used subchannel (SCH) bitmap, the repetition coding indication, the coding indication, and the MAP message length.

Following the FCH 410, a DL-MAP 414 and a UL-MAP 416 may specify data burst allocation and other control information for the DL and UL subframes 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary IEEE 802.16m Super Frame

Figure 5:
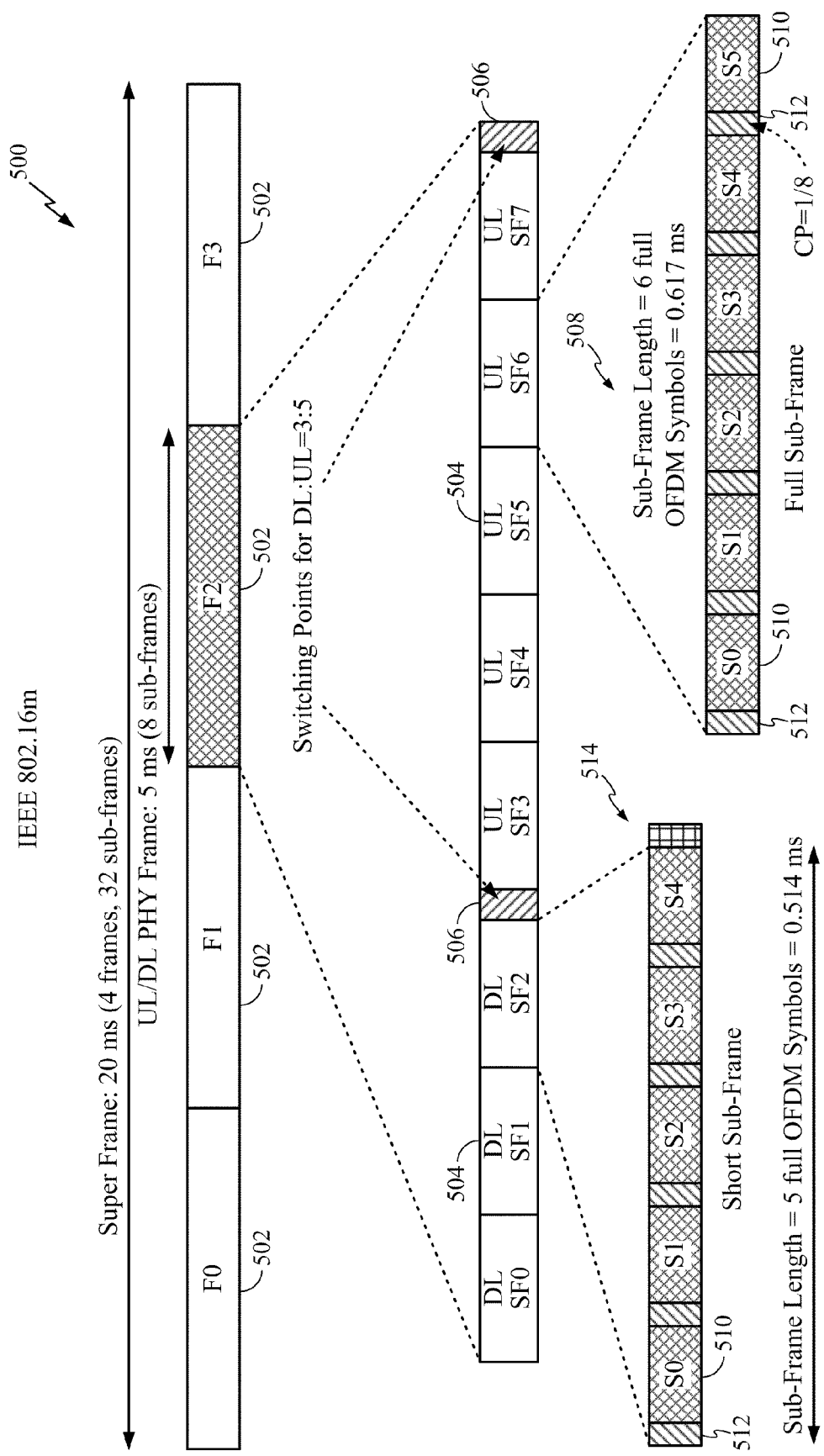
FIG. 5 illustrates an example OFDM/OFDMA super frame according to the IEEE 802.16m standard, in accordance with certain embodiments of the present disclosure.

FIG. 5 illustrates an example super frame 500 in accordance with the IEEE 802.16m standard. The IEEE 802.16m super frame 500 has a duration of 20 ms and comprises 4 OFDM/OFDMA frames 502 (labeled F0 to F3 in FIG. 5). Each frame 502 has a duration of 5 ms, similar to the OFDMA/OFDMA frame 400 in accordance with the IEEE 802.16e standard described above.

However, rather than each frame being divided into a single DL subframe 402 and a UL subframe 404 as in IEEE 802.16e, each IEEE 802.16m frame 502 is divided into eight subframes 504 (labeled SF0 to SF7 in FIG. 5). The subframes 504 may be split into DL and UL subframes, with switch points 506 between different subframe types. For example, FIG. 5 depicts frame F2 having a DL:UL subframe ratio of 3:5, representative of three DL subframes followed by five UL subframes in frame F2. There may be either one or two DL-to-UL switch points 506 within each frame 502.

A subframe 504 (e.g., SF6 as illustrated) may be a full subframe 508 having six OFDM symbols 510 with a cyclic prefix (CP) 512 equal to one eighth of the symbol duration. Therefore, a full subframe 508 has a duration of 0.617 ms. Another subframe 504 (e.g., SF2 as illustrated) may be a short subframe 514 having five OFDM symbols 510 with the same length CP 512. Therefore, a short subframe 514 has a duration of 0.514 ms.

Exemplary LTE Radio Frame

Figure 6:
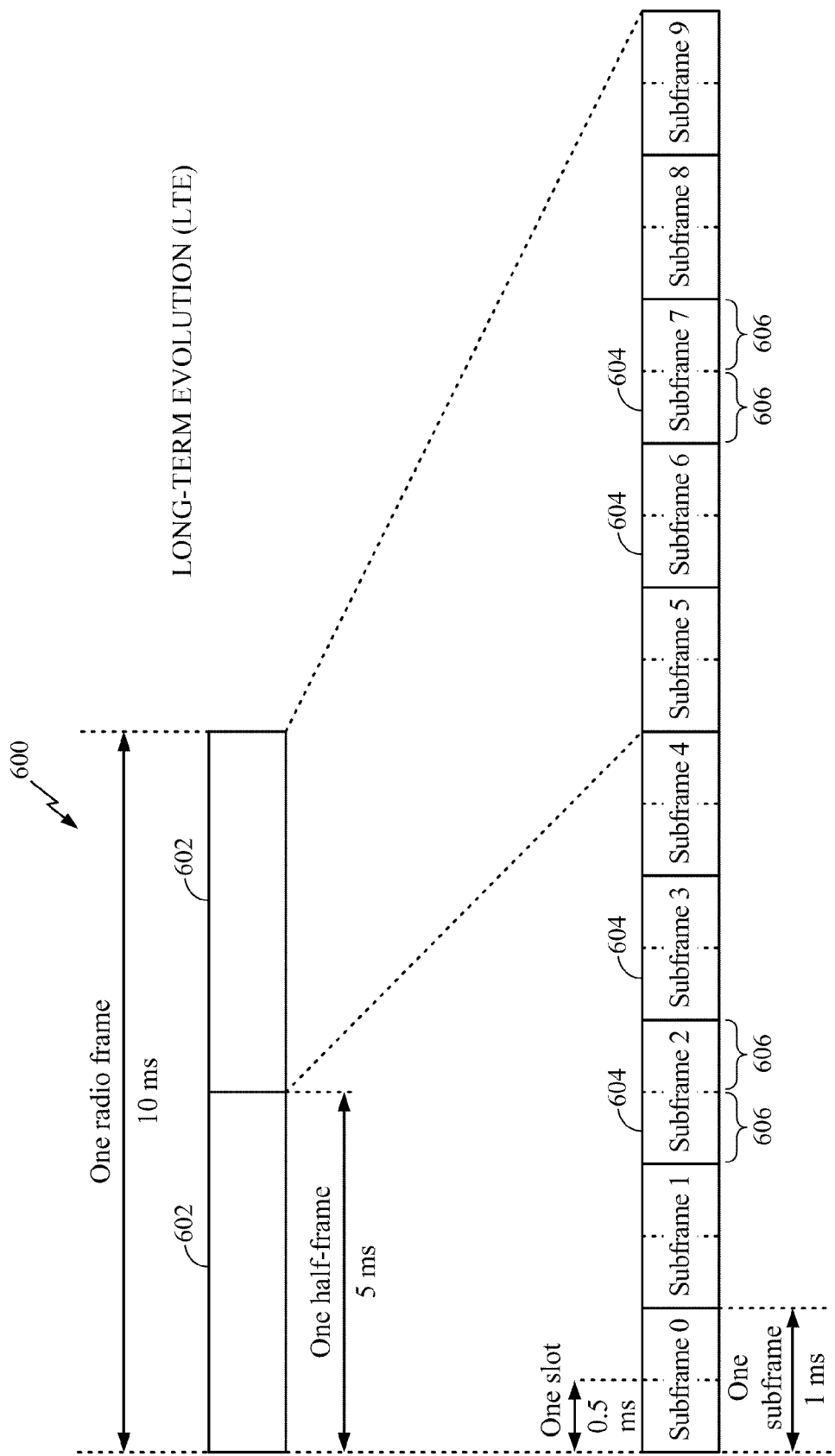
FIG. 6 illustrates an example radio frame according to the Long Term Evolution (LTE) standard in accordance with certain embodiments of the present disclosure.

FIG. 6 illustrates an example radio frame 600 according to the Long Term Evolution (LTE) standard. Having a duration of 10 ms, the radio frame 600 may be divided into two half-frames 602, each having a duration of 5 ms. The radio frame 600 may be divided into ten subframes 604 (labeled Subframe 0 to Subframe 9 in FIG. 6), each having a duration of 1 ms. Each subframe 604 may be divided into two slots 606, each slot having a duration of 0.5 ms. The LTE symbol duration may be about 71 µs or 83 µs, depending on the CP length, such that a slot 606 comprises either 7 or 6 symbols, respectively.

In the LTE standard, a long frame may be composed entirely of broadcast subframes or composed entirely of normal (unicast) subframes or a combination of normal and broadcast subframes. One or more broadcast type long frames can occur within a radio frame. A short frame may also be composed of either a normal or a broadcast subframe and one or more broadcast type short frames can occur in a radio frame. Broadcast frames may be grouped with other broadcast frames to improve channel estimation for the unicast and non-unicast data (common pilots may be used from adjacent subframes), and/or broadcast frames may be interspaced with non-broadcast frames for time interleaving.

At least one additional subframe type may be of type "blank." A blank subframe may be empty or contain a fixed or pseudo-randomly generated payload. A blank subframe may be used for interference avoidance, interference measurements, or when data is not present in a frame in a radio frame. Other subframe types may also be defined.

In LTE-TDD, each subframe 604 may be designated as a DL subframe, a UL subframe, or a subframe containing a switch point in switching between DL and UL transmissions. FIG. 7 illustrates seven different subframe configurations 700 (labeled configuration 0 to configuration 6) for LTE-TDD according to the LTE standard. The subframe designations for each subframe 0 to 9 of an LTE-TDD radio frame are provided for each configuration, where "D" represents a DL subframe, "U" represents a UL subframe, and "S" represents a subframe containing a switch point. Each configuration has a switch-point periodicity of either 5 ms or 10 ms.

Exemplary Coexistence Between Two Radio Access Technologies

With two or more different RATs supported, a particular wireless network location may be covered by a different BS for each RAT. This can become expensive for a network provider providing wireless service according to multiple RATs. In some cases, a dual-mode or multi-mode BS may support two or more different RATs, but these base stations may sacrifice some efficiency when communicating according to more than one RAT.

Figure 8:
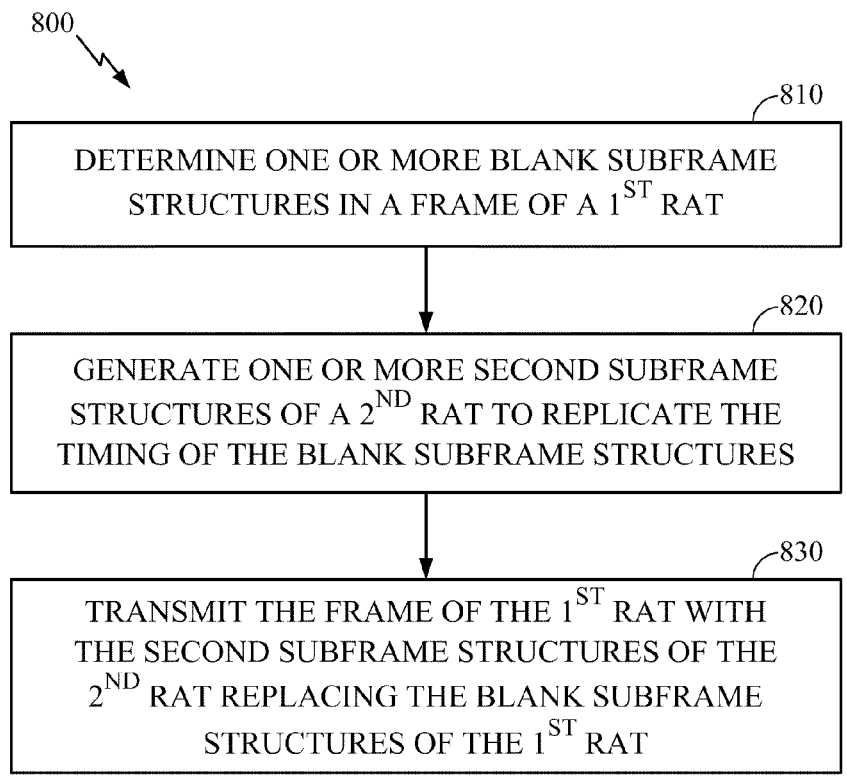
FIG. 8 is a flow chart of example operations for transmitting a frame in a first radio access technology (RAT) where blank subframe structures of the first RAT have been replaced by subframe structures of a second RAT, in accordance with certain embodiments of the present disclosure.

FIG. 8 is a flow chart of example operations 800 for transmitting a frame in a first radio access technology (RAT) where blank subframe structures of the first RAT have been replaced by subframe structures of a second RAT. For some embodiments, the first RAT may be LTE, either LTE-FDD or LTE-TDD, and the second RAT may be in accordance with the IEEE 802.16e or 802.16m standards. The operations 800 may be performed by a dual-mode or multi-mode base station (BS).

The operations 800 may begin, at 810, by determining one or more blank subframe structures in a frame of a first RAT. For example, a multi-mode BS may determine which LTE subframes will be blank subframes with no data, representing a gap in transmission for the first RAT. The blank subframe structures may be contiguous, dispersed, or any combination thereof within the frame of the first RAT. Contiguous blank subframe structures may offer the most flexibility for replacing the blank subframe structures with other subframe structures of a second RAT.

At 820, the multi-mode BS may generate one or more second subframe structures of the second RAT to replicate the timing of the blank subframe structures. In other words, the multi-mode BS may determine the duration and timing of transmission gaps for the first RAT according to the blank subframe structures. Next, the multi-mode BS may determine how may second subframe structures of the second RAT may fit within the transmission gaps and then generate these second subframe structures accordingly. Examples of this second subframe structure generation are described in greater detail below with respect to specific RATs.

Once the second subframe structures of the second RAT have been generated at 820, the multi-mode BS may transmit the frame of the first RAT with these second subframe structures replacing the blank subframe structures. In other words, where the multi-mode BS had planned for transmission gaps in the first RAT, the multi-mode BS may at least partially fill these gaps with portions (subframes or symbols) of the second RAT. In this manner, the first and second RATs may coexist and be transmitted from a single multi-mode BS.

Exemplary Coexistence Between LTE-FDD and IEEE 802.16m Standards

For LTE-FDD, the radio frame 600 is considered as ten 1 ms subframes 604. Blank subframes are defined on LTE DL with either 10 ms periodicity or 40 ms periodicity.

Figure 9:
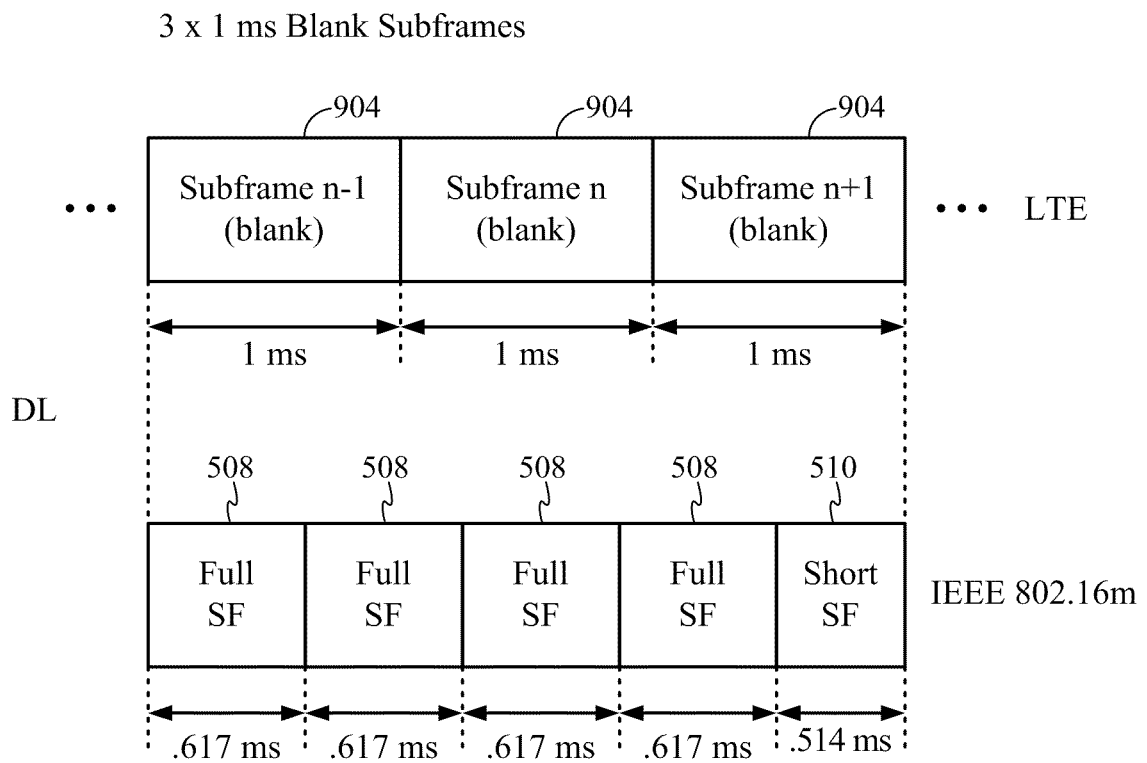
FIG. 9 illustrates replacing LTE frequency-division duplex (FDD) blank subframes with IEEE 802.16m subframes, in accordance with certain embodiments of the present disclosure.

For a blank subframe periodicity of 10 ms, a number of contiguous blank subframes may be defined. For example, FIG. 9 illustrates three contiguous 1 ms blank subframes 904 in an LTE-FDD radio frame, providing for a 3 ms transmission gap in the LTE downlink. Therefore, up to 3 ms of IEEE 802.16m subframes may replace the LTE blank subframes in the transmitted frame. Accordingly, four full IEEE 802.16m subframes 508 (each having a duration of 0.617 ms) and one short IEEE 802.16m subframe 510 (having a duration of 0.514 ms) may replace the three LTE blank subframes (4*0.617 ms+0.514 ms=2.982 ms<3 ms) as illustrated.

However, transmission gaps in the frame 502 or super frame 500 are not currently defined in the IEEE 802.16m standard. In order for coexistence between LTE-FDD and IEEE 802.16m, such gaps in transmission (e.g., blank subframes) may be defined such that data-containing subframes 504 of the IEEE 802.16m frames 502 may be separated by blank subframes. In other words, IEEE 802.16m subframes containing data need not be contiguous. In this manner, a frame 502 may be split apart in time.

Although IEEE 802.16m DL subframes fit nicely within contiguous LTE blank subframes, the IEEE 802.16m UL having synchronous Hybrid Automatic Repeat Request (HARQ) with periodicity in multiples of 0.617 ms may not line up with the current LTE 8 ms UL HARQ timeline. Therefore, LTE UL performance may unfortunately suffer due to DL/UL periodicity mismatch.

For a blank subframe periodicity of 40 ms, the 1 ms LTE transmission gap may occur at random. Therefore, IEEE 802.16m subframes may not align with the random blank subframe at all. Such a proposed solution is clearly inefficient.

Figure 10:
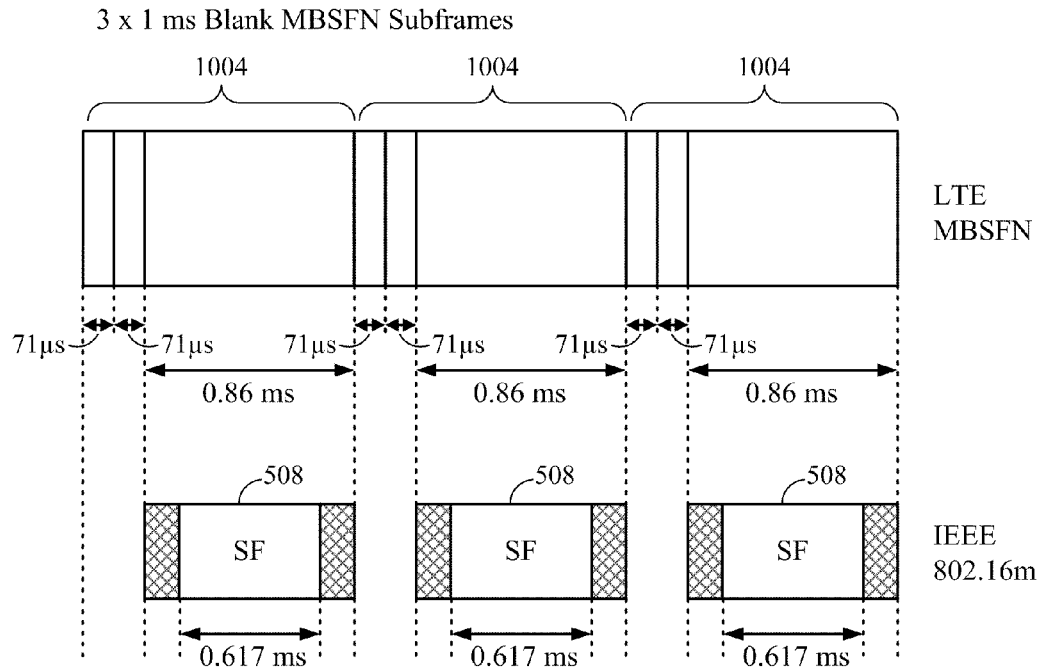
FIG. 10 illustrates replacing LTE frequency-division duplex (FDD) Multimedia Broadcast Single Frequency Network (MBSFN) blank subframes with IEEE 802.16m subframes, in accordance with certain embodiments of the present disclosure.

Although the LTE DL solution of FIG. 9 with three contiguous blank subframes assumes that the blank subframes are absolute transmission gaps with no control or message data, the default for Release 8 of the LTE standard is with Multimedia Broadcast Single Frequency Network (MBSFN) blank subframes. In an MBSFN blank subframe, the first one or two OFDM symbols may be designated for control signaling as illustrated in FIG. 10. In this case, the gap left for each MBSFN subframe may be as small as 0.86 ms (1 ms−2*0.7143 ms) or 0.83 ms (1 ms−2*0.8333 ms), depending on the CP length.

Therefore, three contiguous MBSFN blank subframes 1004 may be replaced by up to three full IEEE 802.16m subframes 508 (having a duration of 0.617 ms) as illustrated. Each of the IEEE 802.16m subframes 508 may be located anywhere within the 0.86 ms or 0.83 ms LTE transmission gap. When the LTE radio frame is transmitted containing the three IEEE 802.16m subframes, the frame may also contain the LTE MBSFN control signals at the same points in time for each of the blank subframes replaced.

If the MBSFN control symbols are located anywhere in the middle of the LTE blank subframe (i.e., anywhere but the very beginning or very end), the number of possible IEEE 802.16m subframes replacing the MBSFN blank subframes may be further limited. For example, three contiguous MBSFN blank subframes with such control symbols may be replaced by only up to two full IEEE 802.16m subframes 508.

Again for MBSFN blank subframes, the IEEE 802.16m UL having synchronous HARQ with periodicity in multiples of 0.617 ms may not line up with the current LTE 8 ms UL HARQ timeline. Therefore, LTE UL performance may unfortunately suffer due to DL/UL periodicity mismatch.

Also, an MBSFN blank subframe periodicity of 40 ms may most likely have the same problem as described above: the 1 ms LTE transmission gap may occur at random. Therefore, IEEE 802.16m subframes may not align with the random MBSFN blank subframe at all. Such a proposed solution may lack efficiency.

For certain embodiments of the present disclosure, an LTE relay may coexist with an IEEE 802.16m backhaul. Instead of acting as a base station of the IEEE 802.16m system on blank/MBSFN subframes, the relay may act as a mobile station (MS) of the IEEE 802.16m system.

Exemplary Coexistence Between LTE-TDD and IEEE 802.16m Standards

For LTE-TDD, replacing blank subframes with IEEE 802.16m subframes in an effort to achieve coexistence between the two standards may be further complicated by the prior existence of DL/UL partitioning. Such partitioning is described above with respect to FIG. 7, and different configurations of DL/UL partitioning for LTE-TDD are presented in the LTE standard. In all of these configurations, LTE-TDD is allocated for DL in subframes 0, 1, 5, and 6.

Figure 11:
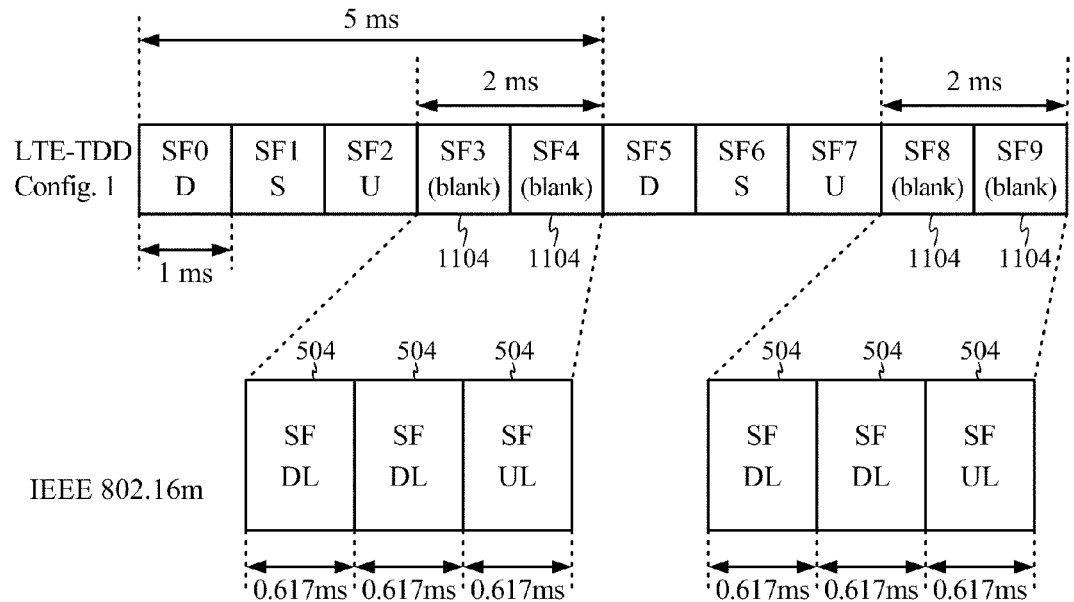
FIG. 11 illustrates replacing LTE time-division duplex (TDD) blank subframes with IEEE 802.16m subframes, in accordance with certain embodiments of the present disclosure.

FIG. 11 illustrates replacing LTE-TDD blank subframes with IEEE 802.16m subframes in configuration 1, as an example. For configuration 1, there may be two blank subframes 1104 having a duration of 2 ms in every 5 ms half-frame 602. For example, LTE-TDD subframes 3 and 4 (SF3 and SF4) may be blank subframes 1104, whereas subframe 0 (SF0) may be a DL subframe, subframe 1 (SF1) may be switch point, and subframe 2 (SF2) may be a UL subframe in the first half-frame 602 as depicted in FIG. 11. Likewise in the second half-frame 602, LTE-TDD subframes 8 and 9 (SF8 and SF9) may be blank subframes 1104, whereas subframe 5 (SF5) may be a DL subframe, subframe 6 (SF6) may be switch point, and subframe 7 (SF7) may be a UL subframe.

With a duration of 2 ms, the two contiguous LTE-TDD blank subframes 1104 may be replaced by three IEEE 802.16m subframes 504 (3*0.617 ms=1.851 ms<2 ms). For some embodiments, the three IEEE 802.16m subframes may comprise two DL subframes followed by one UL subframe. For other embodiments, the designation of IEEE 802.16m subframes 504 may be different.

However, transmission gaps in the IEEE 802.16m frame 502 or super frame 500 are not currently defined in the standard. In order for coexistence between LTE-TDD and IEEE 802.16m, such gaps in transmission (e.g., blank subframes) may be defined such that data-containing subframes 504 of the IEEE 802.16m frames 502 may be separated by blank subframes. In this manner, a frame 502 may be split apart in time.

Figure 12:
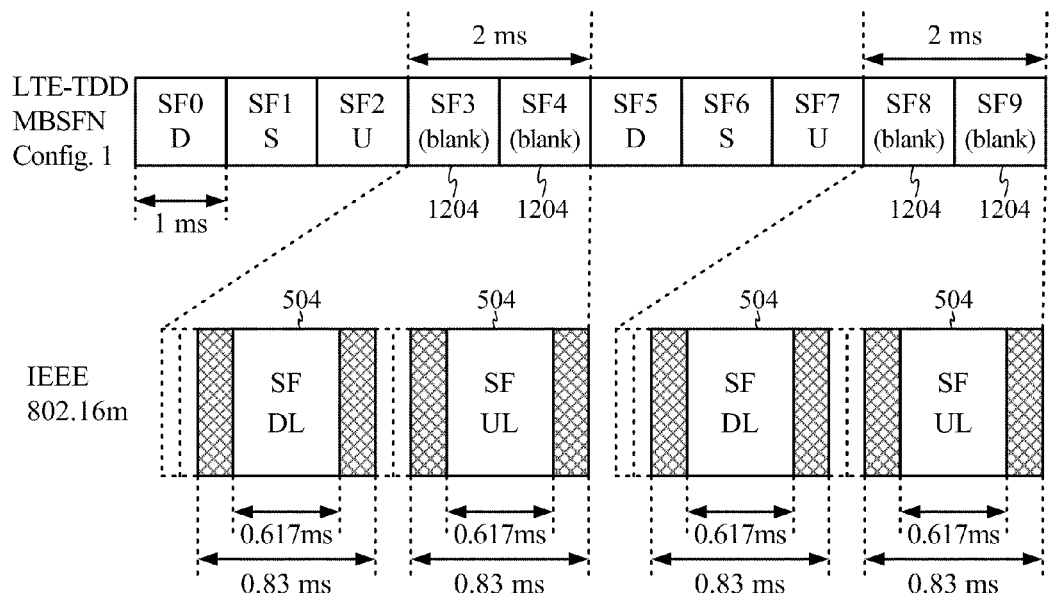
FIG. 12 illustrates replacing LTE-TDD MBSFN blank subframes with IEEE 802.16m subframes, in accordance with certain embodiments of the present disclosure.

If the LTE standard supports MBSFN, the MBSFN blank subframes 1204 at SF3, SF4, SF8, and SF9 in configuration 1 may have transmission gaps of only 0.83 ms or 0.86 ms as described above. FIG. 12 illustrates replacing two LTE-TDD MBSFN blank subframes 1204 with two IEEE 802.16m subframes 504 in each LTE-TDD configuration 1 half-frame 602. For example, the two IEEE 802.16m subframes 504 may comprise one DL subframe followed by one UL subframe.

For certain embodiments of the present disclosure, a dual-mode or multi-mode base station that supports the IEEE 802.16m multi-carrier TDD specifications and the LTE-FDD specifications may be provided. For certain embodiments of the present disclosure, the IEEE 802.16m TDD may be utilized over each of the LTE DL/UL carriers. Since the LTE DL and UL blank subframe structures might differ, this solution may be efficient for configuring the HARQ structure.

Exemplary Coexistence Between LTE-TDD and IEEE 802.16e Standards

Rather than the subframe granularity possible with the IEEE 802.16m standard, the IEEE 802.16e standard specifies frame structure with a periodicity of 5 ms, which supports OFDM DL to UL switching with symbol level granularity. Therefore, IEEE 802.16e offers greater configuration flexibility for coexistence with the LTE standard.

Figure 13:
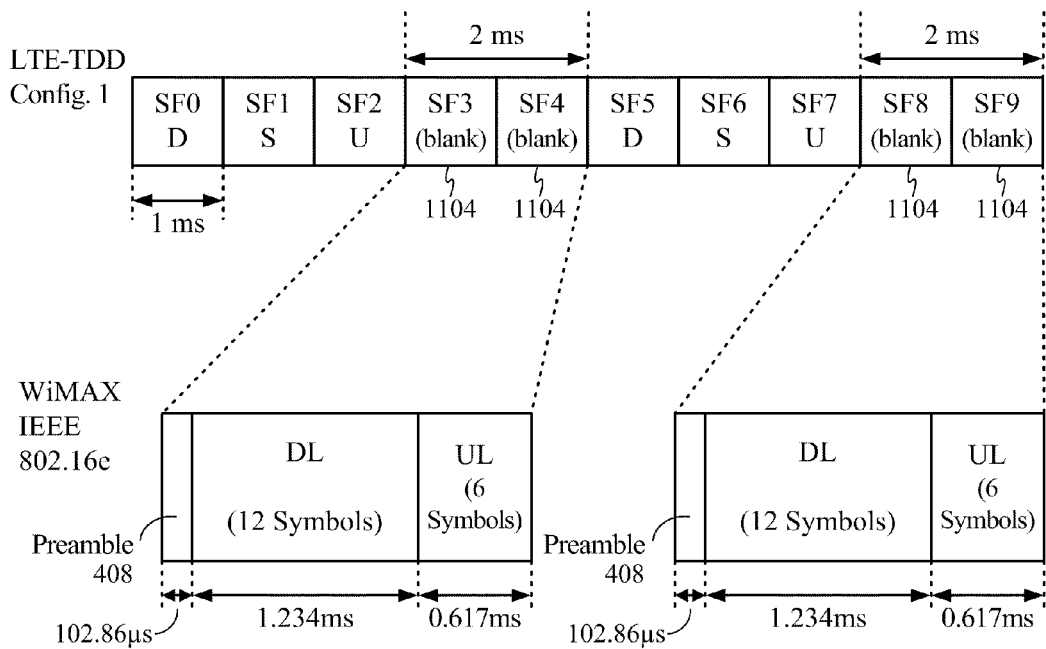
FIG. 13 illustrates replacing LTE-TDD blank subframes with IEEE 802.16e symbols, in accordance with certain embodiments of the present disclosure.

For example, FIG. 13 illustrates replacing LTE-TDD blank subframes 1104 in configuration 1 with IEEE 802.16e symbols, in accordance with certain embodiments of the present disclosure. The two contiguous blank subframes 1104 have a duration of 2 ms out of every 5 ms half-frame 602. Therefore, the two LTE-TDD blank subframes 1104 may be replaced by up to 19 IEEE 802.16e symbols (19*102.86 μs=1.95 ms<2 ms). For example, the 19 symbols may comprise one symbol for the preamble 408, twelve symbols of the DL subframe 402 having a duration of 1.234 ms (12*102.86 μs) and six symbols of the UL subframe 404 having a duration of 0.617 ms (6*102.86 μs). In this manner, the preamble of the IEEE 802.16e standard may be preserved.

Figure 8A:
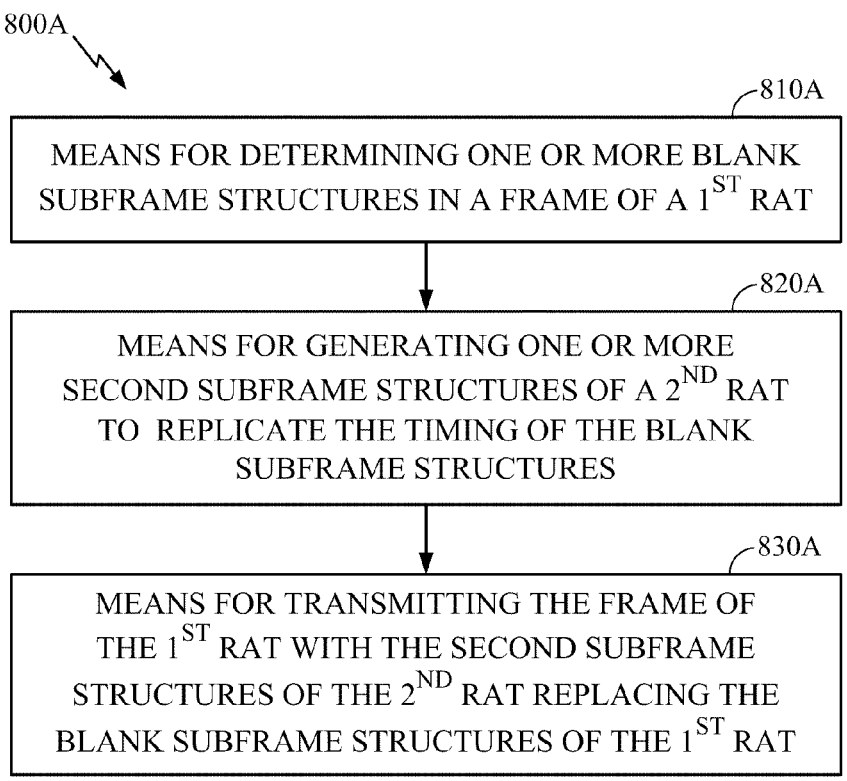
FIG. 8A is a block diagram of means corresponding to the example operations of FIG. 8 for transmitting a frame in a first RAT including subframe structures of a second RAT, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 810-830 illustrated in FIG. 8 correspond to means-plus-function blocks 810A-830A illustrated in FIG. 8A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium that is known in the art. Some examples of storage media that may be used include random access memory (RAM), flash memory, read only memory (ROM), EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a user terminal and/or base station as applicable. For example, such a device can be coupled to a server to facilitate the transfer of means for performing the methods described herein. Alternatively, various methods described herein can be provided via a storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications, comprising:
   determining one or more blank subframe structures in a frame of a first radio access technology (RAT);
   generating one or more second subframe structures of a frame of a second RAT sized to fit within the duration of the one or more blank subframe structures, said generating performed by splitting the one or more second subframe structures from other subframe structures of the frame of the second RAT; and
   transmitting the frame of the first RAT with the one or more second subframe structures of the second RAT replacing the one or more blank subframe structures of the first RAT such that the one or more second subframe structures of the second RAT are transmitted non-contiguously and in a different frame of the first RAT from the other subframe structures of the frame of the second RAT.

2. The method of claim 1, wherein the first RAT is Long Term Evolution (LTE).

3. The method of claim 2, wherein the second RAT is IEEE 802.16m.

4. The method of claim 3, wherein the blank subframe structures have a periodicity of 10 ms and comprise three contiguous 1 ms blank subframes and the second subframe structures comprise four IEEE 802.16m full subframes and an IEEE 802.16m shortened subframe.

5. The method of claim 3, wherein the blank subframe structures have a periodicity of 40 ms and the second subframe structures replace a randomly located 1 ms blank subframe in the frame.

6. The method of claim 3, wherein the blank subframe structures comprise two contiguous 1 ms blank subframes out of every 5 ms and the second subframe structures comprise three IEEE 802.16m subframes.

7. The method of claim 6, wherein the three IEEE 802.16m subframes comprise two downlink (DL) subframes and one uplink (UL) subframe.

8. The method of claim 3, wherein the blank subframe structures comprise multimedia broadcast single frequency network (MBSFN) subframes with control symbols.

9. The method of claim 8, wherein the blank subframes comprise three contiguous MBSFN subframes, each MBSFN subframe having a gap of about 0.83 ms, and the second subframe structures comprise three IEEE 802.16m subframes.

10. The method of claim 8, wherein the blank subframe structures comprise two contiguous MBSFN subframes out of every 5 ms, each MBSFN subframe having a gap of about 0.83 ms, and the second subframe structures comprise two IEEE 802.16m subframes.

11. The method of claim 2, wherein the second RAT is Worldwide Interoperability for Microwave Access (WiMAX) according to IEEE 802.16e.

12. The method of claim 11, wherein the blank subframe structures comprise two contiguous 1 ms blank subframes out of every 5 ms and the second subframe structures comprise twelve orthogonal frequency-division multiplexing (OFDM) downlink (DL) symbols and six OFDM uplink (UL) symbols.

13. A computer-program product for wireless communications comprising a non-transitory computer-readable medium having instructions stored thereon, the instructions being executable by one or more processors and the instructions comprising:
  instructions for determining one or more blank subframe structures in a frame of a first radio access technology (RAT);
  instructions for generating one or more second subframe structures of a frame of a second RAT sized to fit within the duration of the one or more blank subframe structures, said generating performed by splitting the one or more second subframe structures from other subframe structures of the frame of the second RAT; and
  instructions for transmitting the frame of the first RAT with the one or more second subframe structures of the second RAT replacing the one or more blank subframe structures of the first RAT such that the one or more second subframe structures of the second RAT are transmitted non-contiguously and in a different frame of the first RAT from the other subframe structures of the frame of the second RAT.

14. The computer-program product of claim 13, wherein the first RAT is Long Term Evolution (LTE).

15. The computer-program product of claim 14, wherein the second RAT is IEEE 802.16m.

16. The computer-program product of claim 15, wherein the blank subframe structures have a periodicity of 10 ms and comprise three contiguous 1 ms blank subframes and the second subframe structures comprise four IEEE 802.16m full subframes and an IEEE 802.16m shortened subframe.

17. The computer-program product of claim 15, wherein the blank subframe structures have a periodicity of 40 ms and the second subframe structures replace a randomly located 1 ms blank subframe in the frame.

18. The computer-program product of claim 15, wherein the blank subframe structures comprise two contiguous 1 ms blank subframes out of every 5 ms and the second subframe structures comprise three IEEE 802.16m subframes.

19. The computer-program product of claim 18, wherein the three IEEE 802.16m subframes comprise two downlink (DL) subframes and one uplink (UL) subframe.

20. The computer-program product of claim 15, wherein the blank subframe structures comprise multimedia broadcast single frequency network (MBSFN) subframes with control symbols.

21. The computer-program product of claim 20, wherein the blank subframes comprise three contiguous MBSFN subframes, each MBSFN subframe having a gap of about 0.83 ms, and the second subframe structures comprise three IEEE 802.16m subframes.

22. The computer-program product of claim 20, wherein the blank subframe structures comprise two contiguous MBSFN subframes out of every 5 ms, each MBSFN subframe having a gap of about 0.83 ms, and the second subframe structures comprise two IEEE 802.16m subframes.

23. The computer-program product of claim 14, wherein the second RAT is Worldwide Interoperability for Microwave Access (WiMAX) according to IEEE 802.16e.

24. The computer-program product of claim 23, wherein the blank subframe structures comprise two contiguous 1 ms blank subframes out of every 5 ms and the second subframe structures comprise twelve orthogonal frequency-division multiplexing (OFDM) downlink (DL) symbols and six OFDM uplink (UL) symbols.

25. An apparatus for wireless communications, comprising:
  means for determining one or more blank subframe structures in a frame of a first radio access technology (RAT);
  means for generating one or more second subframe structures of a frame of a second RAT sized to fit within the duration of the one or more blank subframe structures, said generating performed by splitting the one or more second subframe structures from other subframe structures of the frame of the second RAT; and
  means for transmitting the frame of the first RAT with the one or more second subframe structures of the second RAT replacing the one or more blank subframe structures of the first RAT such that the one or more second subframe structures of the second RAT are transmitted non-contiguously and in a different frame of the first RAT from the other subframe structures of the frame of the second RAT.

26. The apparatus of claim 25, wherein the first RAT is Long Term Evolution (LTE).

27. The apparatus of claim 26, wherein the second RAT is IEEE 802.16m.

28. The apparatus of claim 27, wherein the blank subframe structures have a periodicity of 10 ms and comprise three contiguous 1 ms blank subframes and the second subframe structures comprise four IEEE 802.16m full subframes and an IEEE 802.16m shortened subframe.

29. The apparatus of claim 27, wherein the blank subframe structures have a periodicity of 40 ms and the second subframe structures replace a randomly located 1 ms blank subframe in the frame.

30. The apparatus of claim 27, wherein the blank subframe structures comprise two contiguous 1 ms blank subframes out of every 5 ms and the second subframe structures comprise three IEEE 802.16m subframes.

31. The apparatus of claim 30, wherein the three IEEE 802.16m subframes comprise two downlink (DL) subframes and one uplink (UL) subframe.

32. The apparatus of claim 27, wherein the blank subframe structures comprise multimedia broadcast single frequency network (MBSFN) subframes with control symbols.

33. The apparatus of claim 32, wherein the blank subframes comprise three contiguous MBSFN subframes, each MBSFN subframe having a gap of about 0.83 ms, and the second subframe structures comprise three IEEE 802.16m subframes.

34. The apparatus of claim 32, wherein the blank subframe structures comprise two contiguous MBSFN subframes out of every 5 ms, each MBSFN subframe having a gap of about 0.83 ms, and the second subframe structures comprise two IEEE 802.16m subframes.

35. The apparatus of claim 26, wherein the second RAT is Worldwide Interoperability for Microwave Access (WiMAX) according to IEEE 802.16e.

36. The apparatus of claim 35, wherein the blank subframe structures comprise two contiguous 1 ms blank subframes out of every 5 ms and the second subframe structures comprise twelve orthogonal frequency-division multiplexing (OFDM) downlink (DL) symbols and six OFDM uplink (UL) symbols.

37. An apparatus for wireless communications, comprising:
- logic for determining one or more blank subframe structures in a frame of a first radio access technology (RAT);
- logic for generating one or more second subframe structures of a frame of a second RAT sized to fit within the duration of the one or more blank subframe structures, said generating performed by splitting the one or more second subframe structures from other subframe structures of the frame of the second RAT; and
- logic for transmitting the frame of the first RAT with the one or more second subframe structures of the second RAT replacing the one or more blank subframe structures of the first RAT such that the one or more second subframe structures of the second RAT are transmitted non-contiguously and in a different frame of the first RAT from the other subframe structures of the frame of the second RAT.

38. The apparatus of claim 37, wherein the first RAT is Long Term Evolution (LTE).

39. The apparatus of claim 38, wherein the second RAT is IEEE 802.16m.

40. The apparatus of claim 39, wherein the blank subframe structures have a periodicity of 10 ms and comprise three contiguous 1 ms blank subframes and the second subframe structures comprise four IEEE 802.16m full subframes and an IEEE 802.16m shortened subframe.

41. The apparatus of claim 39, wherein the blank subframe structures have a periodicity of 40 ms and the second subframe structures replace a randomly located 1 ms blank subframe in the frame.

42. The apparatus of claim 39, wherein the blank subframe structures comprise two contiguous 1 ms blank subframes out of every 5 ms and the second subframe structures comprise three IEEE 802.16m subframes.

43. The apparatus of claim 42, wherein the three IEEE 802.16m subframes comprise two downlink (DL) subframes and one uplink (UL) subframe.

44. The apparatus of claim 39, wherein the blank subframe structures comprise multimedia broadcast single frequency network (MBSFN) subframes with control symbols.

45. The apparatus of claim 44, wherein the blank subframes comprise three contiguous MBSFN subframes, each MBSFN subframe having a gap of about 0.83 ms, and the second subframe structures comprise three IEEE 802.16m subframes.

46. The apparatus of claim 44, wherein the blank subframe structures comprise two contiguous MBSFN subframes out of every 5 ms, each MBSFN subframe having a gap of about 0.83 ms, and the second subframe structures comprise two IEEE 802.16m subframes.

47. The apparatus of claim 38, wherein the second RAT is Worldwide Interoperability for Microwave Access (WiMAX) according to IEEE 802.16e.

48. The apparatus of claim 47, wherein the blank subframe structures comprise two contiguous 1 ms blank subframes out of every 5 ms and the second subframe structures comprise twelve orthogonal frequency-division multiplexing (OFDM) downlink (DL) symbols and six OFDM uplink (UL) symbols.

* * * * *